United States Patent
LeJeune

(10) Patent No.: US 7,033,506 B2
(45) Date of Patent: Apr. 25, 2006

(54) DEVICE AND METHOD FOR WATER TREATMENT BY FOAMING

(75) Inventor: Armand LeJeune, Saint-Michel-en-l'Herm (FR)

(73) Assignee: Institut Francais de Recherche pour l'Exploitation de la Mer - IFREMER, Paris (FR)

( * ) Notice: Subject to any disclaimer, the term of this patent is extended or adjusted under 35 U.S.C. 154(b) by 0 days.

(21) Appl. No.: 10/240,538

(22) PCT Filed: Mar. 20, 2001

(86) PCT No.: PCT/FR01/00833

§ 371 (c)(1),
(2), (4) Date: May 1, 2003

(87) PCT Pub. No.: WO01/74722

PCT Pub. Date: Nov. 10, 2001

(65) Prior Publication Data

US 2003/0164340 A1 Sep. 4, 2003

(30) Foreign Application Priority Data

Apr. 3, 2000 (FR) .................................. 00 04211

(51) Int. Cl.
*C02F 1/24* (2006.01)
*A01K 63/04* (2006.01)

(52) U.S. Cl. .................. 210/703; 210/221.2; 210/169; 119/263; 119/264

(58) Field of Classification Search ................ 210/703, 210/169, 221.2, 221.1; 119/263, 264
See application file for complete search history.

(56) References Cited

U.S. PATENT DOCUMENTS

| | | | | |
|---|---|---|---|---|
| 4,094,783 A | * | 6/1978 | Jackson | 210/703 |
| 4,690,756 A | | 9/1987 | Van Ry | |
| 4,834,872 A | * | 5/1989 | Overath | 210/151 |
| 5,078,867 A | * | 1/1992 | Danner | 210/169 |
| 5,122,267 A | * | 6/1992 | Giovanetti et al. | 210/188 |
| 5,192,423 A | | 3/1993 | Duczmal et al. | |
| 5,273,624 A | | 12/1993 | Chamberlain et al. | |
| 5,282,962 A | * | 2/1994 | Chen | 210/169 |
| 5,800,704 A | * | 9/1998 | Hansen | 210/169 |

FOREIGN PATENT DOCUMENTS

| | | |
|---|---|---|
| DE | 27 27 398 | 1/1979 |
| DE | 4033223 | * 4/1992 |
| DE | 196 18 428 A1 | 11/1997 |
| DE | 298 08 690 U1 | 9/1998 |

* cited by examiner

*Primary Examiner*—Thomas M. Lithgow
(74) *Attorney, Agent, or Firm*—Finnegan, Henderson, Farabow, Garrett & Dunner LLP

(57) ABSTRACT

The invention relates to apparatus for treating water by skimming, the apparatus comprising:
  a reaction chamber (8);
  injector means (4) for delivering the water for treatment via an injection orifice into the reaction chamber;
  means (20) for forming microbubbles of gas in the water to be treated; and
  condensation means (10) for collecting the resulting foam,
  the apparatus being characterized by the fact that the microbubbles are injected into the reaction chamber (8) together with the water for treatment.

The invention also provides a method of treating water by skimming, in which:
  the water for treatment is injected into a reaction chamber (8);
  microbubbles of gas are formed in the water for treatment; and
  the foam that is produced is separated from the water for treatment,
the method being characterized by the fact that the microbubbles are injected into the reaction chamber (8) together with the water for treatment.

15 Claims, 5 Drawing Sheets

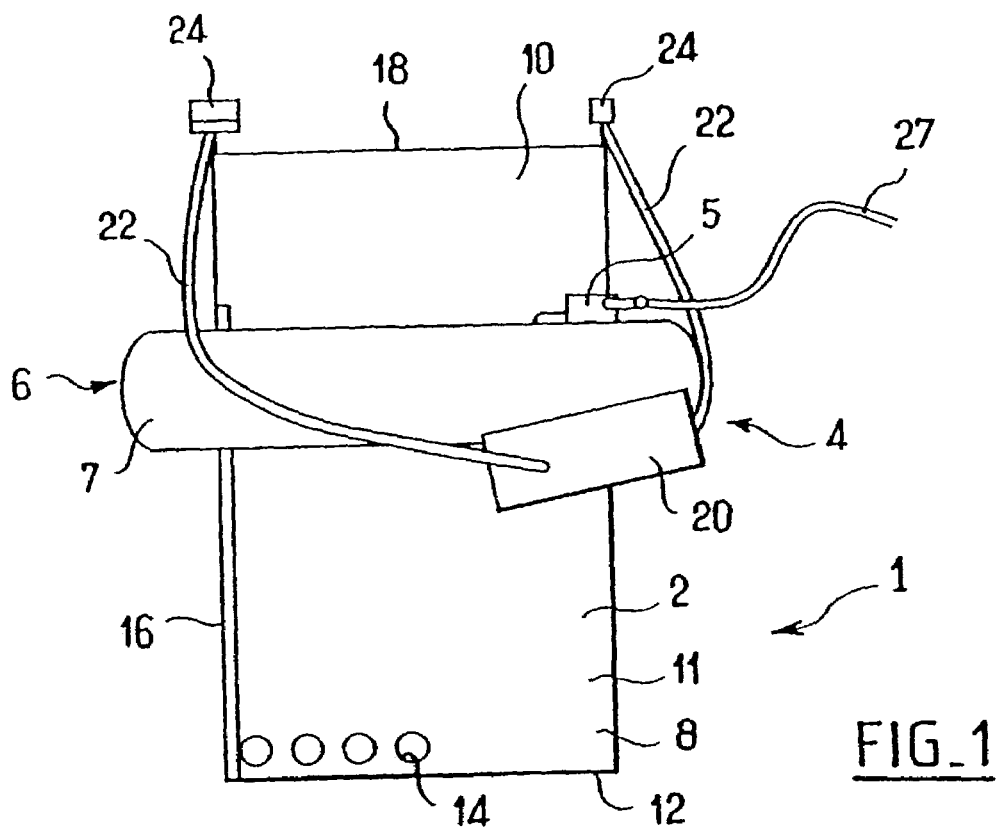
FIG_1
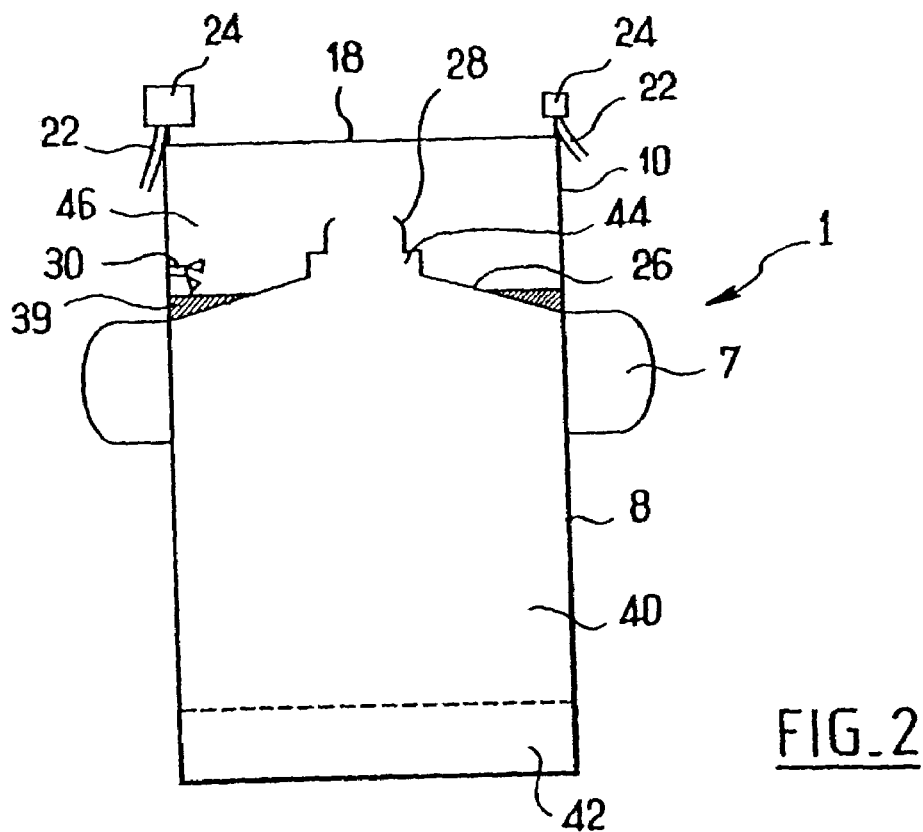
FIG_2

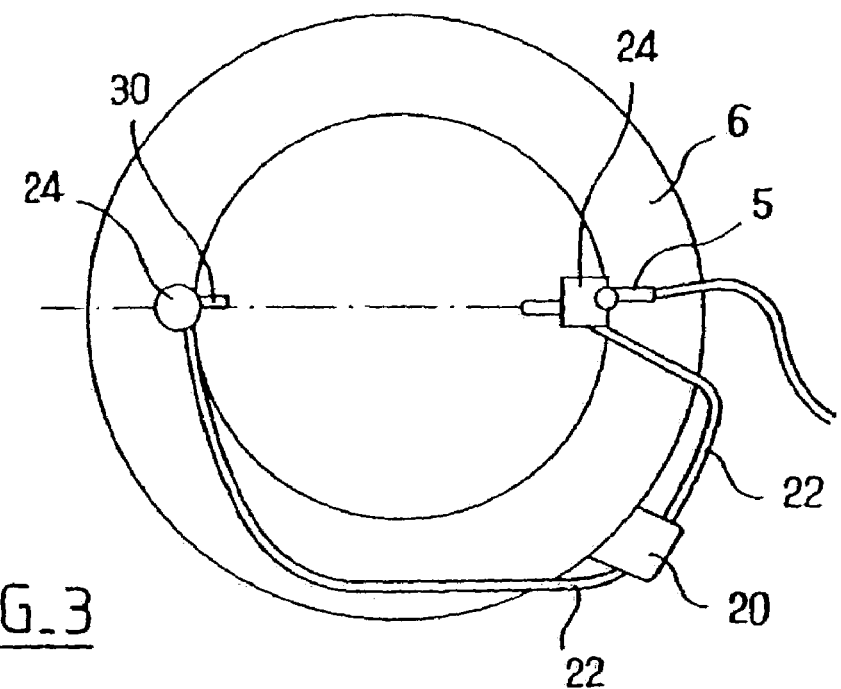
FIG_3
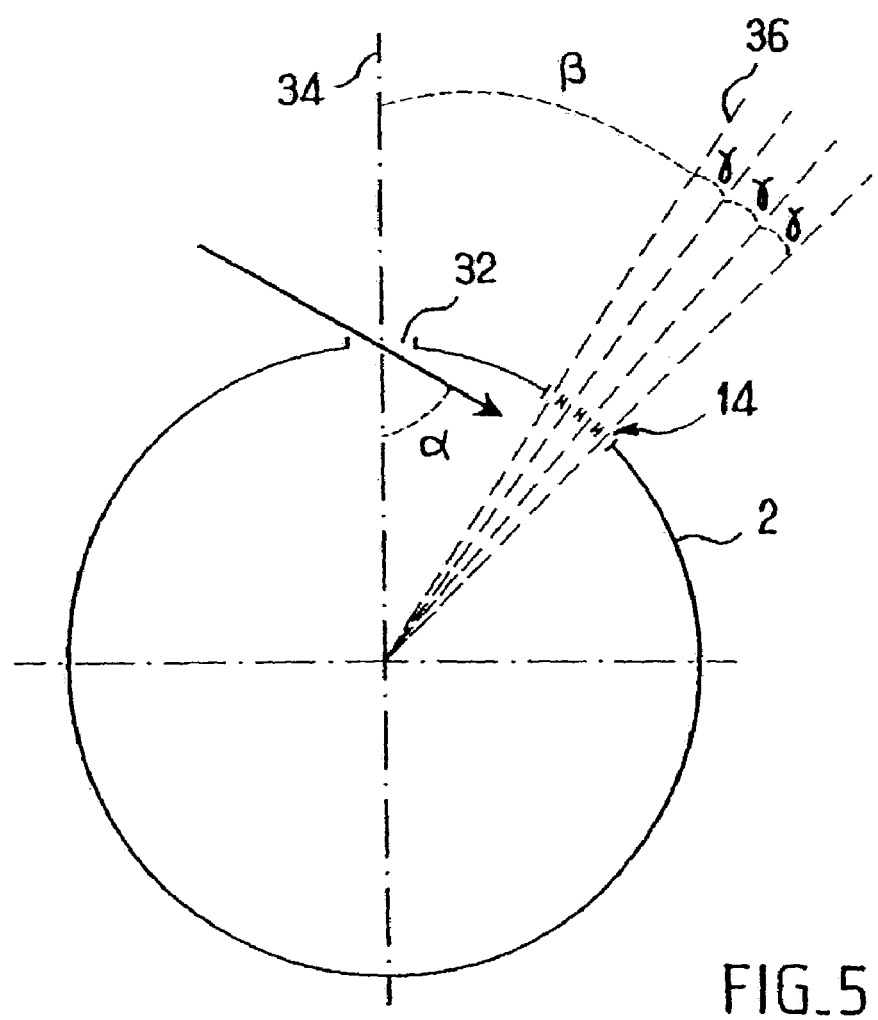
FIG_5

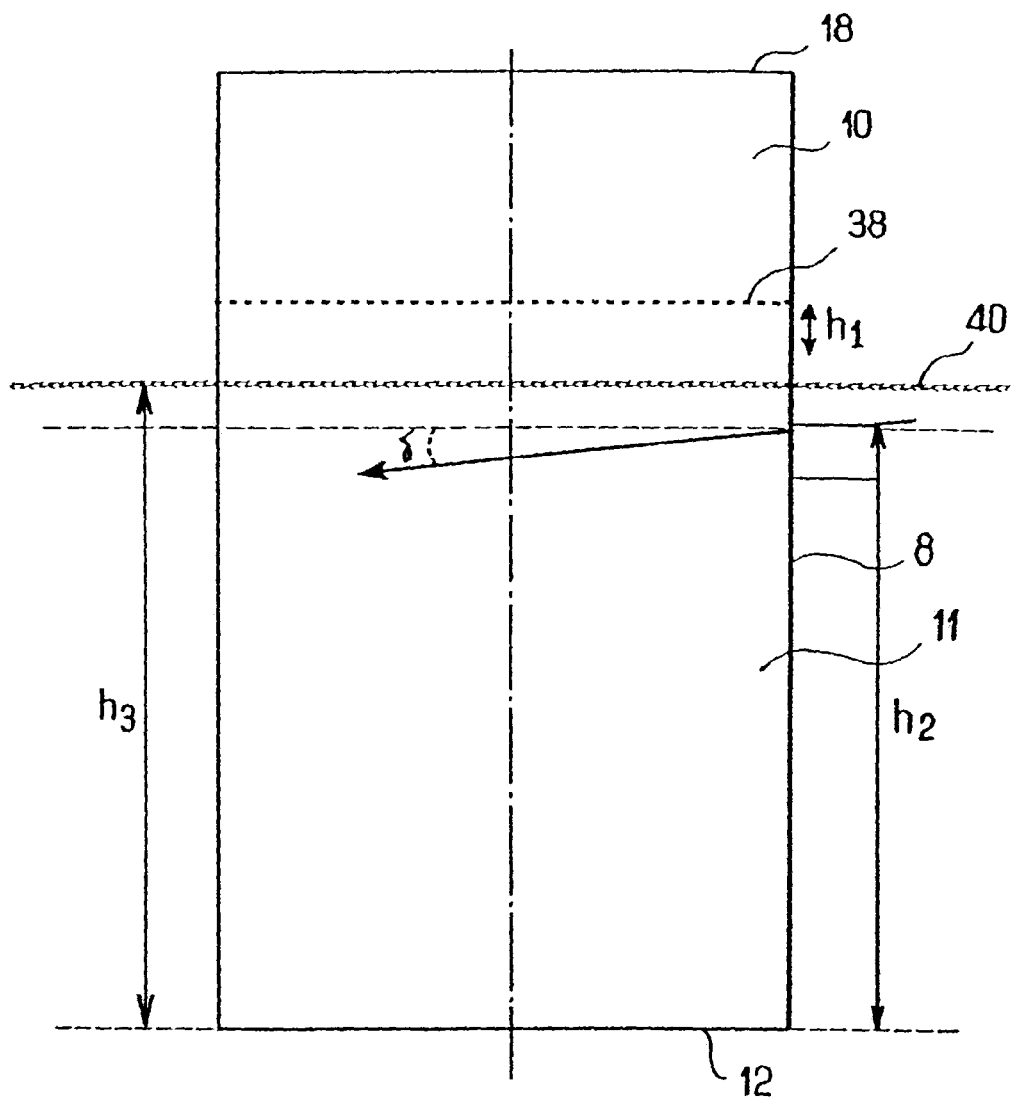
FIG_6
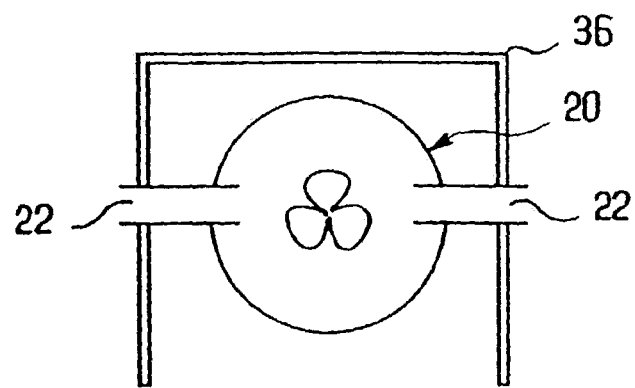
FIG_4

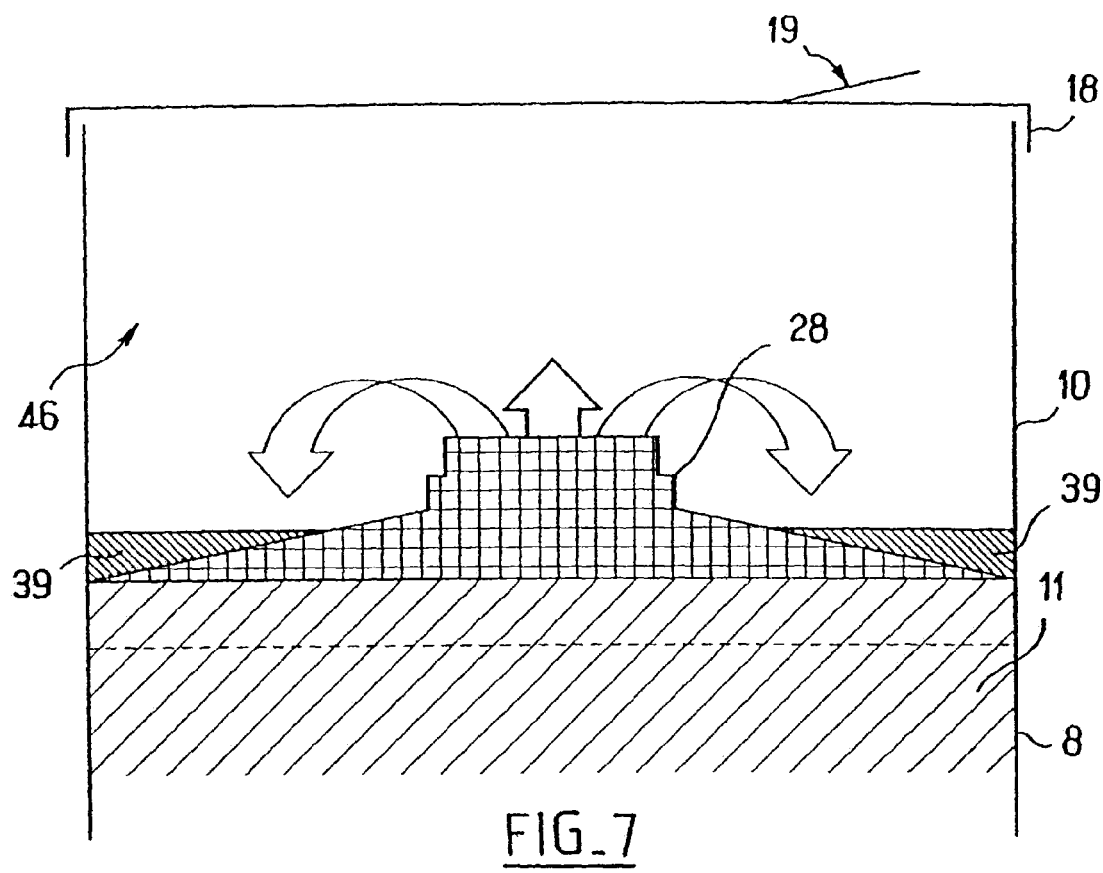
FIG_7
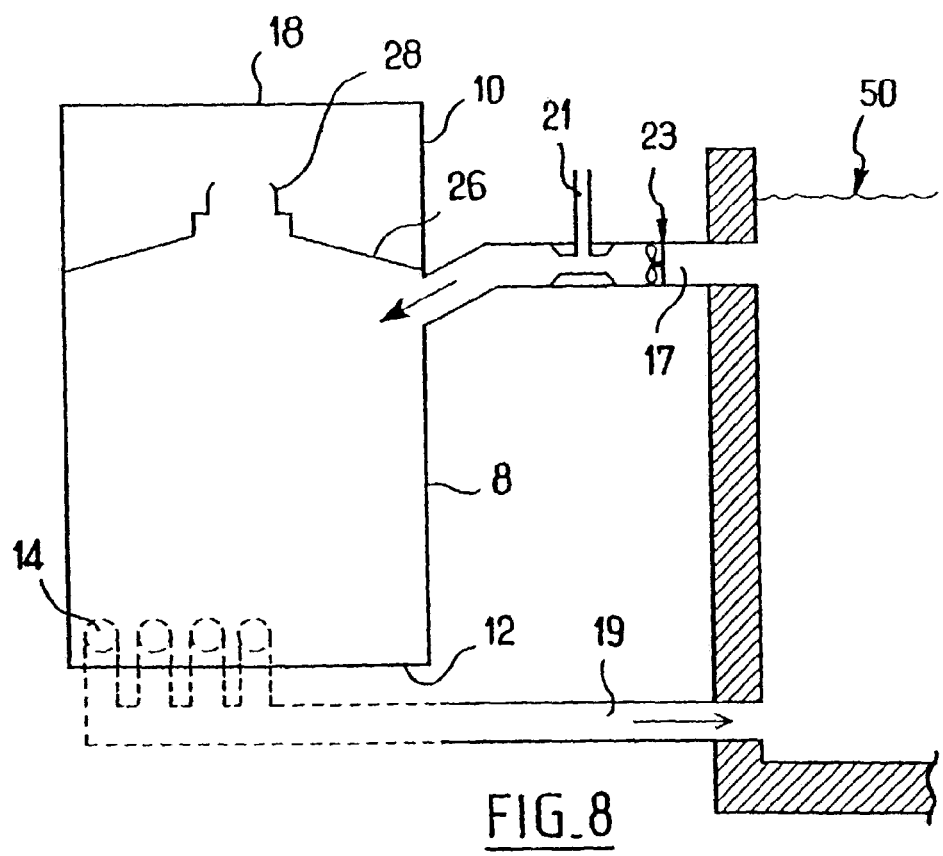
FIG_8

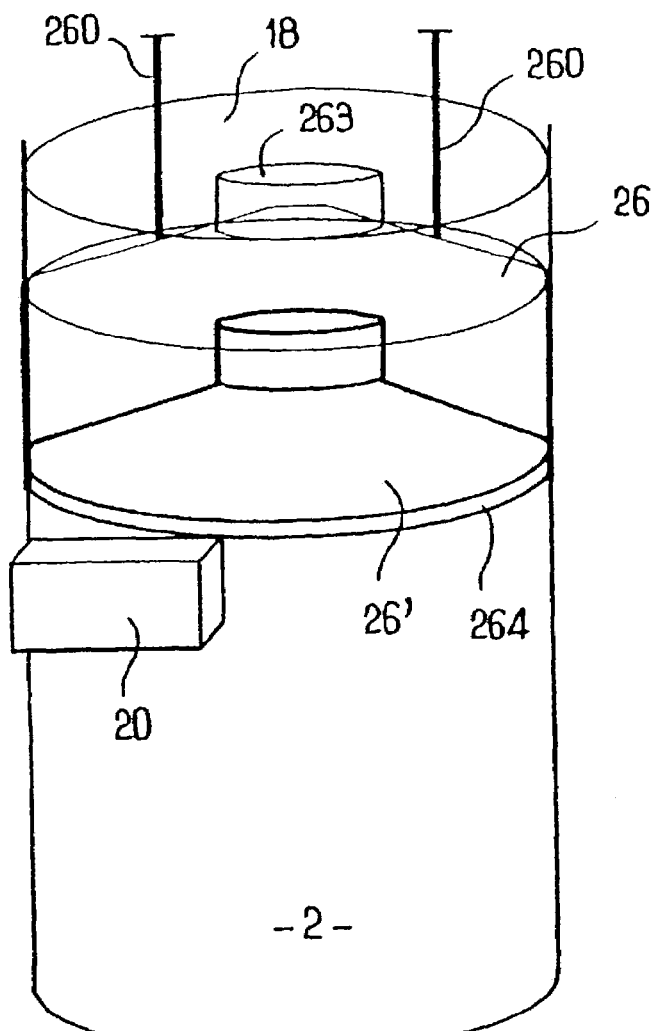
FIG_9
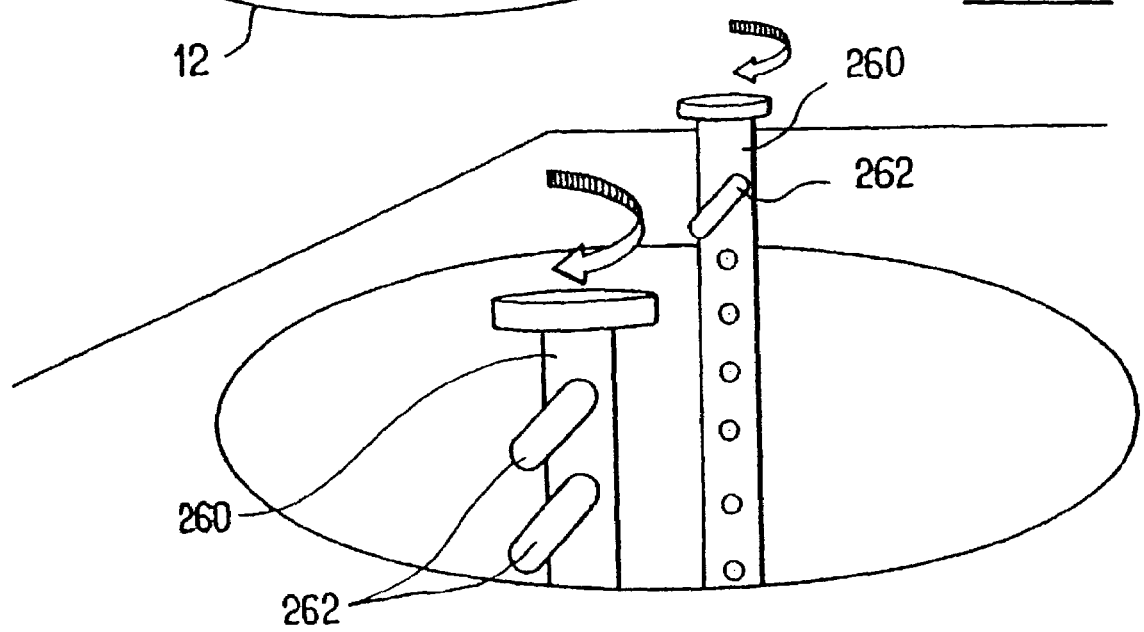
FIG_10

DEVICE AND METHOD FOR WATER TREATMENT BY FOAMING

The invention relates to the field of treating waste water, salt water, or brine coming from industrial activity, maritime activity such as storing seafood, or storing the produce from aqua culture, leisure activities, etc. More precisely, the invention relates to apparatus and a method of treating water by skimming. In this treatment, an operation of producing microbubbles for generating foam is combined with the operations of skimming and flotation.

Document DE 197 56 962, for example, discloses apparatus for treating water by skimming, which apparatus comprises a reaction chamber, injector means for delivering the water for treatment to an injection orifice for injection into the reaction chamber, means for producing foam using the water to be treated and a gas, and skimming means for recovering the foam that is produced. In that apparatus, the bubbles of gas required for flotation are produced by a catalytic reaction of a chemical such as hydrogen peroxide ($H_2O_2$) and the water to be treated.

The object of the invention is to propose apparatus and a method of treating water by skimming serving simultaneously to enrich the gas content of the water (air, oxygen, ozone, etc.), to eliminate dissolved matter by skimming, and to eliminate fine particulate matter by flotation, and to do so in a manner that is different from that proposed in the prior art.

This object is achieved by apparatus for treating water by skimming, the apparatus comprising:
  a reaction chamber;
  injector means for delivering the water for treatment via an injection orifice into the reaction chamber;
  means for forming microbubbles of gas in the water to be treated; and
  condensation means for collecting the resulting foam,
  the apparatus being characterized by the fact that the microbubbles are injected into the reaction chamber together with the water for treatment.

Thus, by using the means for forming microbubbles, the water is enriched with gases, and by using the skimming means, both dissolved matter and the fine particulate matter are eliminated by flotation. However, contrary to that which occurs in prior art apparatus, the microbubbles are injected into the reaction chamber together with the water to be treated.

Advantageously, the apparatus of the invention further comprises the following characteristics which may be independent from one another or combined with one another:
  the injector means create cyclonic circulation of the water in the reaction chamber;
  the means for forming microbubbles comprise a motor-driven propeller and a decompression chamber fed with gas;
  the gas is selected from the list comprising: air; oxygen; and ozone;
  the reaction chamber is circularly cylindrical about a vertical axis;
  the apparatus includes flotation means;
  the reaction chamber has at least one water flow orifice for discharging water from the reaction chamber into the water in which the apparatus is floating;
  in projection onto a horizontal plane, the center of a flow orifice and the center of the injection orifice are separated by an angle lying in the range 50° to 70°, and preferably equal to 62°;
  the apparatus presents four flow orifices separated by an angle lying in the range 10° to 20°, and preferably equal to 14°, said angle having its vertex on a vertical axis situated in the center of the reaction chamber;
  the injector means generate a pressure such that regardless of the density of the water, the water level inside the vessel is maintained in the range 10 cm to 20 cm, and preferably 15 cm±2 cm above the level of the water in which the apparatus is floating;
  the injector means inject water into the reaction chamber at an angle greater than 20°, and preferably greater than 25°, corresponding to the angle as projected onto a horizontal plane between the direction in which the water for treatment is injected into the reaction chamber and the normal to the inside surface of said reaction chamber at the injection orifice;
  the injector means inject the water into the reaction chamber at an angle relative to a horizontal plane that lies in the range 2° to 15°, and more preferably in the range 5° to 10°;
  the reaction chamber is surmounted by a condensation chamber, these two chambers being separated by a cone provided with at least one opening;
  the cone separating the reaction chamber from the condensation chamber is adjustable in height; and
  the apparatus includes a chimney that is adjustable in height so as to control condensation of the foam.

In another aspect, the invention provides a method of treating water by skimming, in which:
  the water for treatment is injected into a reaction chamber;
  microbubbles of gas are formed in the water for treatment; and
  the foam that is produced is separated from the water for treatment,
the method being characterized by the fact that the microbubbles are injected into the reaction chamber together with the water for treatment.

Advantageously, in the method, cyclonic circulation of the water is established inside the reaction chamber.

Also advantageously, in the method, the reaction chamber is caused to float.

Other aspects, objects, and advantages of the invention will be better understood on reading the following detailed description. The invention will also be better understood on referring to the drawings, in which:

FIG. 1 is a diagrammatic side view of an embodiment of apparatus in accordance with the present invention;

FIG. 2 is a diagrammatic vertical section through the apparatus of the invention shown in FIG. 1;

FIG. 3 is a diagrammatic plan view of the apparatus of the invention as shown in FIGS. 1 and 2 with the cover removed;

FIG. 4 is a diagrammatic cross-section of the means for forming microbubbles in the apparatus shown in FIGS. 1 to 3;

FIG. 5 is a diagram showing the angular position differences between the injection orifice and the water flow orifices in the reaction chamber of the apparatus of the invention shown in FIGS. 1 to 3;

FIG. 6 is a diagram showing the orientation of the stream of water to be treated at the outlet from the injection orifice as it enters into the reaction chamber of the apparatus shown in FIGS. 1 to 3 and 5;

FIG. 7 is a diagrammatic vertical section through the condensation chamber of the apparatus of the invention as shown in FIGS. 1 to 3 and 5 and 6;

FIG. 8 is a diagrammatic vertical section through a variant of the apparatus of the invention shown in FIGS. 1 to 3 and 5 to 7;

FIG. 9 is a diagram showing a cone placed between the reaction chamber and the condensation chamber, the height of said cone being adjustable; and FIG. 10 is a diagram showing a particular embodiment of the means for adjusting the height of the above-mentioned cone.

An embodiment of apparatus for treating water by skimming in accordance with the present invention is described below with reference to FIGS. 1 to 7.

In this embodiment, the apparatus 1 of the invention is designed to be immersed directly in a basin containing the water to be treated.

As shown in FIG. 1, the water treatment apparatus 1 comprises a cylindrical vessel 2, injection and microbubble forming means 4, apparatus 5 for pumping the foam that is formed by the injection and microbubble forming means 4, and flotation means 6.

The cylindrical vessel 2 comprises a reaction chamber 8 and a condensation chamber 10, both of them cylindrical about a vertical axis. The reaction chamber 8 is used for developing foam formation. The condensation chamber 10 receives the foam formed in the reaction chamber 8.

The bottom end of the reaction chamber 8 is closed by a bottom wall 12. In operation it contains a water column 11. It is provided close to the bottom wall 12 with four flow orifices 14. The total section of the flow orifices 14 should give rise to extra pressure in the reaction chamber 8 corresponding to a height $h_1$ of abut 150 millimeters (mm) (see FIG. 6). Thus, for a reaction chamber 8 having a diameter of 100 centimeters (cm) through which there flows a volume of water equal to about 100 cubic meters per hour ($m^3/h$), the total section of the flow holes 14 is approximately 300 square centimeters ($cm^2$). The reaction chamber 8 is also provided with a level indicator 16. This indicator 16 is constituted, for example, by means of a transparent tube connected to the bottom end of the reaction chamber 8. The level of water in the reaction chamber 8 can then be seen on the indicator 16.

The condensation chamber 10 comprises a cover 18 and a condensation cone 26 separating the reaction chamber 8 from the condensation chamber 10 proper (see FIG. 2). The cover 18 closes the condensation chamber 10 so as to prevent foam from escaping or being entrained by the wind. In order to avoid having pressure greater than atmospheric pressure in the condensation chamber 10, the cover 18 is provided with a flap 19 or with small perforations allowing air to escape while retaining the foam (see FIG. 7). The condensation cone 26 is constituted by a wall forming a truncated cone with its smaller opening pointing upwards. The condensation cone 26 is extended upwards by a chimney 28.

Preferably, in order to make it possible to adjust foam production which is associated with the foaming ability of the water, the condensation cone 28 is vertically movable and adjustable in height. For this purpose, it is slidably mounted in leaktight manner along the cylindrical vessel 2. This adjustment makes it possible to reduce or increase the volume of the reaction chamber 8 at will. Sealing means, such as an O-ring 264 are preferably provided at the periphery of the cone 26 to provide leaktightness between the periphery of the cone 26 and the vessel 2, regardless of the position chosen for the cone 26. The cone 26 can be fixed in the chosen position relative to the vessel 2 with the help of any appropriate means. By way of non-limiting example, the cone 26 can be fixed using vertical rods 260 secured to the top surface of the cone and provided with notches 262 that are not circularly symmetrical and that are distributed along the length of the rods 260. The fixed cover 18 is provided with oblong holes of shape complementary to the above-mentioned notches 262. To move the cone 26 vertically, the notches are brought into alignment with the openings through the cover so as to pass through them. The cone 26 is prevented from moving as soon as the notches 262, which face transversely relative to the openings in the cover, comes to rest thereagainst.

In order to make it possible to perform finer, second adjustment, the chimney 28 may itself be adjustable in height relative to the cone 26 so as to adjust the rate at which foam leaves the reaction chamber 8.

The condensation chamber 10 is also provided with a switch 30. This switch 30 is situated at a height that is lower than the height of the condensation cone 26. The switch 30 triggers automatic operation of the pumping apparatus 5.

The injection and microbubble forming means 4 are constituted by a propeller-driven Venturi aerator block 20, two pipes 22, and two suction orifices 24. It is situated beneath the flotation means 6. Each pipe 22 independently connects the Venturi aerator block 20 to a suction orifice 24 situated on the cover 18. The pipes 22 are connected to the Venturi aerator block 20 in symmetrical manner relative to its longitudinal axis (see FIGS. 3 and 4).

As shown in FIG. 4, the Venturi aerator block 20 is covered in an upside-down channel section 36 which is used both to fix the Venturi aerator block 20 to the cylindrical vessel 2 and to ensure that water sucked into the Venturi aerator block 20 does not entrain air coming from the surface of the water in the basin in which the apparatus 1 is immersed. The Venturi aerator block 20 can be tilted about a horizontal axis containing the pipes 22.

The Venturi aerator block 20 injects bubbles into the water to be treated, these bubbles are very fine and they are also known as microbubbles. By way of example, it corresponds to the Venturi aerator block descried in document EP 0 562 314. It thus produces a stream of fluid constituted by water and by air. This fluid is injected into the reaction chamber 8 via an injection orifice 32.

As shown in FIG. 5, the direction in which fluid from the Venturi aerator block 20 is injected into the reaction chamber 2, when projected onto a horizontal plane, is at an angle α relative to the radius 34 connecting the central vertical axis of the reaction chamber 2 to the injection orifice 32. This angle α is equal to about 70°.

The angle between the radius 34 and the radius 36 passing through the center of the flow orifice 14 closest to the injection orifice 32, when projected onto a horizontal plane corresponds to an angle β. This angle β is equal to about 60°.

The flow orifices 14 are spaced apart angularly by an angle γ equal to 14°.

As shown in FIG. 6, the stream of fluid constituted by water and air leaving the Venturi aerator block 20 is injected into the reaction chamber 8 at an angle δ lying in the range 5° to 10° beneath a horizontal plane.

The center of the injection orifice 32 is situated at a height approximately equal to $h_2=80$ cm above the bottom wall 12 (see FIG. 6).

The flotation means 6 are constituted by an external float 7. The float 7 serves to hold the apparatus 1 at a well-defined level relative to the surface of the water in the basin, and also for the desired level of foam inside the reaction chamber 2. The flotation means 6 are adapted so that regardless of the density of the water, i.e. in particular regardless of its salinity, the line of flotation 40 is at a height $h_3=95\pm2$ cm relative to the bottom wall 12 (see FIG. 6).

The apparatus 1 described structurally above operates as described below.

The Venturi aerator block 20 sucks in both water from the basin in which the apparatus 1 is immersed and air taken via the pipe 22 from the surface of the basin. The Venturi aerator block 20 mixes these two fluids together and injects the resulting mixture into the reaction chamber 8 in such a manner as to develop cyclone type circulation in the water column 11. The pressure of the water column 11 then rises slightly, raising the inside water level 38 as can be seen on the indicator 16 to a little above the flotation line 40 (see FIG. 6). The microbubbles that have been formed rise towards the surface and form the foam which accumulates beneath the concentration cone 26, while the treated water escapes via the flow orifices 14. The flow escapes via the chimney 28. After accumulating for a certain length of time in the condensation chamber 10, the foam condenses in the form of a liquid in the portion of the condensation chamber 10 that is situated beneath the level of the top orifice of the condensation cone 28. It forms a condensate 39 (see FIG. 7). Once the level of the condensate 39 is high enough, it triggers the switch 30 which puts the pumping apparatus 5 into operation. The condensate 39 is then removed by a pipe 27 to a unit for storing or recycling foam.

As shown in FIG. 2, the apparatus 1 has four distinct zones in operation:
- an air/water contact zone 40 where physical interchange takes place between the microbubbles and the water to be injected;
- a zone 42 having treated water without any microbubbles, with the flow orifices 14 being situated in this zone;
- a foam concentration zone 44 between the level of the water in the reaction chamber 8 and the condensation cone; and
- the foam condensation zone 46 where the condensate 39 is stored and pumped.

The performance of the apparatus 1 depends on the quality of the water to be treated and on its foaming ability.

The above-described apparatus 1 has capacity to treat 100 m³ of water per hour, and under such conditions it condenses up to 30 liters (l) of foam per hour. Setting the inside level 38 of the water column 11 at a pressure which is higher inside the reaction chamber 8 than the flotation level 40 is a parameter of particular importance. If this inside level 38 is too high, then the foam that is formed produces a condensate 39 that is not very concentrated. If the inside level 38 is too low, then the foam does not travel properly into the condensation chamber 10.

By means of the apparatus 1, it is possible to concentrate dissolved elements in the foam, together with particles having size for the most part lying in the range about 1 micron (μm) to 10 μm.

By way of example, the condensate 39 accumulates approximately 50 micrograms (mg) to 100 mg of dissolve organic carbon per liter of treated water, whereas the water for treatment contains 2 mg/l to 4 mg/l thereof. Similarly, the condensate 39 accumulates 1000 mg to 5000 mg of dry particulate matter per liter of treated water, whereas the water for treatment contains 10 mg/l to 20 mg/l.

The apparatus in accordance with the invention for treating water by skimming can be made in numerous variants.

In one such variant, for example, the injector means 4 are constituted by a Venturi effect aeration accessory 21.

In another such variant, the water treatment apparatus of the invention is not immersed and is implemented in the form of a device for placing beside a reservoir basin 50 containing water for treatment.

An example of a variant of the apparatus of the invention is shown in FIG. 8. This variant is implemented in the form of a device for placing beside a reservoir basin 50 and it has injector means 4 constituted by a Venturi effect aeration accessory 21 co-operating with another water centrifugal pump 23.

This apparatus operates in a loop. Two pipes connect the device with the reservoir basin 50 respectively for bringing in a mixture of air and water for treatment and for returning treated water. The Venturi effect aeration accessory 21 serves to suck in air and form microbubbles in the plume from the pump 23. The reaction chamber 8 and the condensation chamber 10 are similar to those described with reference to FIGS. 1 to 3 and 5 and 6. Similarly, the injection angles α and δ, the speed and flow rate of the incoming water, and also the pressure in the reaction chamber 8 are analogous to those specified when describing the apparatus of FIGS. 1 to 7. In contrast, the section of the flow orifices in the bottom portion is increased so as to compensate for the additional head losses due to the delivery pipe 19.

The water treatment apparatus of the invention can be used to condense bacteria, very fine particles, etc., which are not stopped by conventional mechanical filters that filter elements of a size in excess of 30 μm.

Various applications can be envisaged for the apparatus of the invention. By way of example, mention can be made of treating aqua culture water, purifying water by skimming, treating water in leisure locations such as bathing pools, skimming water in ports (to limit fouling of boats).

The apparatus 1 described above produces foam by mixing air and water, however gases other than air could also be used. For example, for certain kinds of water treatment, it is appropriate to use ozone because of its sterilizing power, or indeed to use oxygen.

The invention claimed is:

1. Apparatus for treating water by skimming, the apparatus comprising:
    a reaction chamber (8);
    injector means (4) for delivering water for treatment via an injection orifice (32) into the reaction chamber;
    at least one water flow orifice (14) for discharging water from the reaction chamber into water in which the apparatus is floating; wherein the center of a flow orifice (14) and the center of the injection orifice (32) are separated by an angle (β), defined in projection onto a horizontal plane, lying in the range 50° to 70°, and preferably equal to 62°,
    means (20) for injecting microbubbles of gas with the water to be treated in the reaction chamber;
    a condensation chamber (10) for collecting the resulting foam, which is provided above the reaction chamber;
    a cone (26) provided with at least one opening, which separates the reaction chamber (8) and the condensation chamber (10); wherein the cone (26) separating the reaction chamber (8) and the condensation chamber (10) is adjustable in height.

2. Apparatus according to claim 1, wherein the injector means (4) create cyclonic circulation of the water in the reaction chamber (8).

3. Apparatus according to claim 1, wherein the means (20) for injecting microbubbles comprises a motor-driven propeller and a decompression chamber fed with gas.

4. Apparatus according to claim 3, comprising a source of gas, wherein the gas is air, oxygen or ozone.

5. Apparatus according the claim 1, wherein the reaction chamber (8) is circularly cylindrical about a vertical axis.

6. Apparatus according to claim 1, which includes flotation means (6).

7. Apparatus according to claim 1, which including means (260, 262) suitable for holding the cone (26) stationary in a selected position.

8. Apparatus according to claim 1, which includes a chimney (28) that is adjustable in height so as to control condensation of the foam.

9. Apparatus according to claim 1 having four flow orifices (14) separated by an angle (y) lying in the range 10° to 20°, and preferably 14°, said angle (y) having its vertex on a vertical axis situated in the center of the reaction chamber.

10. Apparatus according according to claim 6, wherein the injector means (4) generate a pressure such that regardless of the density of the water, the water level inside a vessel (38) is maintained in the range of 10 cm to 20 cm, and preferably 15 cm±2 cm, above the level of the water (40) in which the apparatus is floating.

11. Apparatus according to claim 1, wherein the injector means (4) inject water into the reaction chamber (8) at an angle ($\alpha$) greater that 20°, and preferably greater than 25°, corresponding to the angle as projected onto a horizontal plane between the direction in which the water for treatment is injected into the reaction chamber (8) and the normal to the inside surface of said reaction chamber (8) at the injection orifice (32).

12. Apparatus according to claim 1, wherein injector means (4) inject the water into the reaction chamber (8) at an angle relative to a horizontal plane that lies in the range 2° to 15°, and more preferably in the range 5° to 10°.

13. A method of treating water by skimming, in which:
the water for treatment is injected into a reaction chamber (8), via an injection orifice (32) having a center;
the water is discharged from the reaction chamber by at least one flow orifice (14) having a center, the center of a flow orifice (14) and the center of the injection orifice (32) being separated by an angle ($\beta$), defined in projection onto a horizontal plane, lying in the range 50° to 70°, and preferably equal to 62°; and
microbubbles of gas are injected in the water for treatment; and
the foam that is produced is separated from the water for treatment, into a condensation chamber provided above said reaction chamber, said condensation chamber being separated from the reaction chamber by a cone provided with at least one opening,
wherein the method comprises adjusting the height of said cone for optimizing the production of foam.

14. A method according to claim 13, wherein cyclonic circulation of the water is established inside the reaction chamber (8).

15. A method according to claim 13, wherein the reaction chamber (8) is caused to float.

* * * * *

UNITED STATES PATENT AND TRADEMARK OFFICE
CERTIFICATE OF CORRECTION

PATENT NO. : 7,033,506 B2  Page 1 of 1
APPLICATION NO. : 10/240538
DATED : April 25, 2006
INVENTOR(S) : Jerome Hussenot and Armand LeJeune It is certified that error appears in the above-identified patent and that said Letters Patent is hereby corrected as shown below:

On the title page, item (12), line 2, "LeJeune" should read --Hussenot et al.--.

On the title page, item (75), line 1, insert --Jérôme Hussenot, La Rochelle (FR);--.

On the title page, item (87), line 2, "Nov. 10, 2001" should read --Oct. 11, 2001--.

In claim 1, column 6, line 49, "70 °," should read --70°,--.

In claim 4, column 6, line 67, "oxygen or" should read --oxygen, or--.

In claim 5, column 7, line 1, "according the claim" should read --according to claim--.

In claim 7, column 7, line 5, "including" should read --includes--.

In claim 9, column 7, line 12, "angle (y)" should read --angle (Y)--.

In claim 9, column 7, line 13, "angle (y)" should read --angle (Y)--.

In claim 10, column 7, line 16, delete the second occurrence of "according".

In claim 11, column 7, line 24, "that" should read --than--.

In claim 13, column 8, line 7, "(8), via" should read --(8) via--.

Signed and Sealed this

Twenty-sixth Day of December, 2006

JON W. DUDAS
*Director of the United States Patent and Trademark Office*